(No Model.)
S. DEAN.
FRUIT DRIER.
No. 332,595. Patented Dec. 15, 1885.
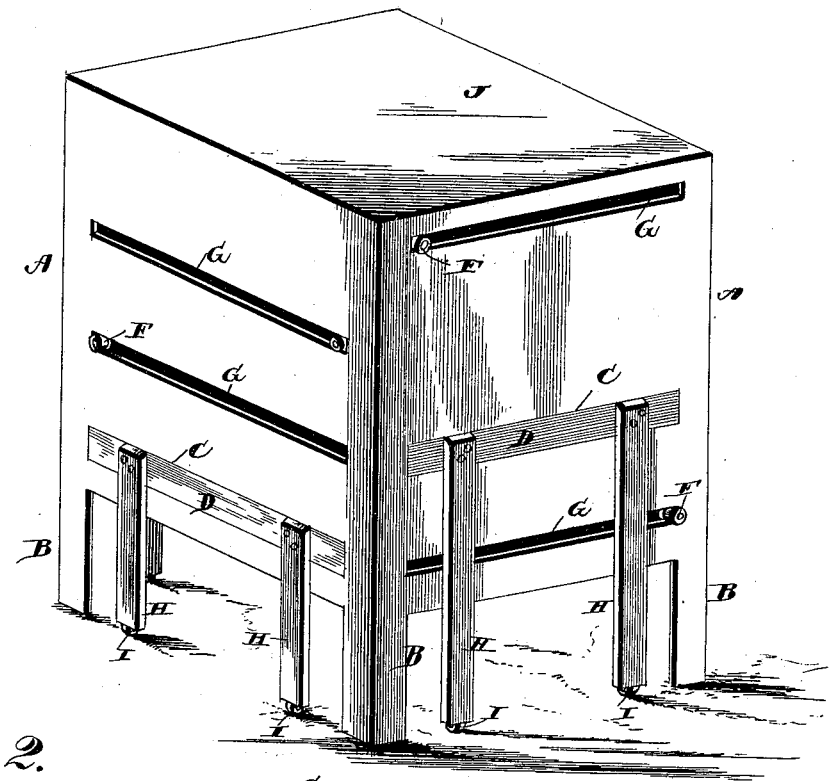
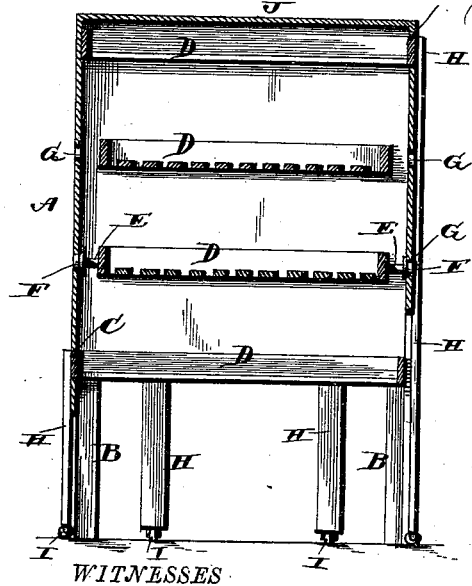
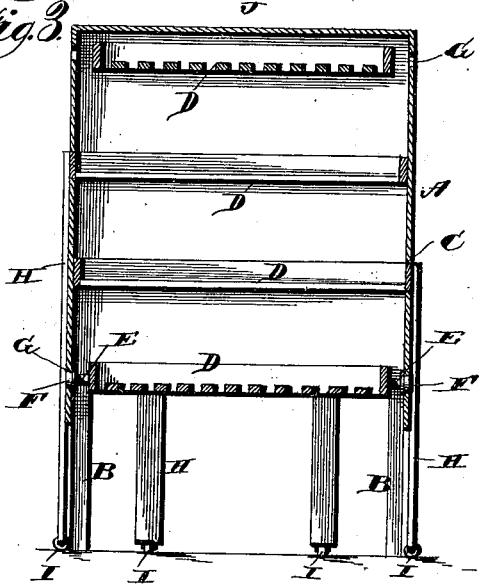
WITNESSES
F. L. Durand
Arthur E. Clifford
INVENTOR:
Samuel Dean
by Louis Bagger & Co.
Attorneys.

UNITED STATES PATENT OFFICE.

SAMUEL DEAN, OF NORTH OGDEN, UTAH TERRITORY.

FRUIT-DRIER.

SPECIFICATION forming part of Letters Patent No. 332,595, dated December 15, 1885.

Application filed August 19, 1885. Serial No. 174,821. (No model.)

*To all whom it may concern:*

Be it known that I, SAMUEL DEAN, a citizen of the United States, and a resident of North Ogden, in the county of Weber and Territory of Utah, have invented certain new and useful Improvements in Fruit-Driers; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved fruit-drier, and Figs. 2 and 3 are vertical sections, taken at right angles to each other of the driver.

Similar letters of reference indicate corresponding parts in all the figures.

My invention has relation to fruit-driers used for drying fruit in the open air; and it consists in the improved construction and combination of parts of the same, as hereinafter more fully described and claimed.

In the accompanying drawings, the letter A indicates a rectangular casing mounted upon legs B, and having an opening or transverse slot, C, in each side, in which slides a drawer or shelf, D, one shelf sliding above the other in the casing, and one drawer sliding out at each side of the casing. The inner ends of these drawers or trays are provided with laterally-projecting trunnions E, which are provided with grooved rollers F, which travel in horizontal slots G in the sides of the casing, and the outer end pieces of the trays are provided with downwardly-projecting legs H, which may be provided with casters I at their lower ends. The top J of the casing is closed, and the entire casing closed, with the exception of the slots in the sides, in which the grooved rollers travel, and these slots are made as narrow as possible, so that the trays will be protected when slid in through their respective apertures. The bottoms of the trays are preferably formed of slats K, although they may be apertured in any other manner, such as formed of wire-netting, perforated sheet metal, or any other perforated or apertured material.

When in use, the drier is placed in a spot where the sun and air will strike it, and the trays are drawn out and filled with the fruit to be dried, and in case of rain or dewy nights the trays may be pushed into the casing and be protected in the same, a tarpaulin or other suitable covering being placed over the entire structure, if desired, to insure that the contents of the trays are kept perfectly dry. The rollers at the inner ends of the drier-trays and the casters under the legs of the trays serve to ease the pulling out or pushing in of the trays, and the legs will support the outer ends of the trays, while the trunnions and their rollers traveling in the slots will prevent the trays from being drawn out too far by bearing against the outer closed ends of the slots when the trays are drawn out as far as they can be drawn without drawing them entirely out of their apertures.

It follows that a greater number of trays than four may be used, when the uppermost tray of one set will be exactly four spaces below the uppermost tray in the set above, and the legs of the lower set of trays will be as much shorter as the legs of the corresponding tray above as the space occupied by four trays. In this manner fruit may be dried in the open air by the heat of the sun, and may at the same time be protected from moisture by pushing the trays into the casing, so that the fruit will not be injured by moisture.

It follows that modifications and changes may be made in the construction of this drier without departing from the spirit of my invention—such as having the rollers of the trays travel in tracks upon the inner sides of the side pieces of the casing, making the sides of the casing entirely closed with the exception of the apertures for the trays, making it in sections with hinges to fold for shipment, &c.— or in the manner of supporting the outer ends of the trays, and I wish to reserve myself the right to all such modifications.

Having thus described my invention, I claim and desire to secure by Letters Patent of the United States—

The combination of a rectangular casing having horizontal apertures in its sides, and having horizontal slots to the sides of the apertures and in a level with the said apertures, trays having perforated bottoms and provided with laterally-projecting trunnions at their inner ends, provided with grooved rollers traveling in the slots, and downwardly-projecting supports or legs secured to the outer ends of the trays and provided with casters at their lower ends, as and for the purpose shown and set forth.

In testimony that I claim the foregoing as my own I have hereunto affixed my signature in presence of two witnesses.

SAMUEL DEAN.

Witnesses:
GEO. S. DEAN,
D. S. DEAN.